US008602054B2

United States Patent
Jilderos

(10) Patent No.: US 8,602,054 B2
(45) Date of Patent: Dec. 10, 2013

(54) VALVE ASSEMBLY FOR A DIFFERENTIAL PRESSURE SENSOR WITH SAFETY VALVE

(75) Inventor: Daniel Jilderos, Bramhult (SE)

(73) Assignee: TA Hydronics AB, Ljung (SE)

( * ) Notice: Subject to any disclaimer, the term of this patent is extended or adjusted under 35 U.S.C. 154(b) by 0 days.

(21) Appl. No.: 13/805,703

(22) PCT Filed: May 27, 2011

(86) PCT No.: PCT/SE2011/050662
§ 371 (c)(1),
(2), (4) Date: Dec. 20, 2012

(87) PCT Pub. No.: WO2012/002875
PCT Pub. Date: Jan. 5, 2012

(65) Prior Publication Data
US 2013/0092260 A1    Apr. 18, 2013

(30) Foreign Application Priority Data
Jun. 28, 2010   (SE) ...................... 1100082

(51) Int. Cl.
| F16K 17/26 | (2006.01) |
| F16K 24/00 | (2006.01) |
| F16K 17/00 | (2006.01) |
| F16K 21/04 | (2006.01) |
| F16K 11/20 | (2006.01) |
| G01L 27/00 | (2006.01) |

(52) U.S. Cl.
USPC ............... 137/493.8; 137/493.9; 137/538; 137/597; 73/1.62; 73/1.72

(58) Field of Classification Search
CPC .......... F16K 17/044; F16K 17/02; F16K 1/32
USPC ........ 137/597, 493.8, 493.7, 493.9, 538, 493; 73/37, 1.01, 1.57, 1.62, 1.72
See application file for complete search history.

(56) References Cited

U.S. PATENT DOCUMENTS

| 3,437,964 A | 4/1969 | Tausch |
| 3,651,827 A | 3/1972 | Hammer et al. |
| 5,282,492 A | 2/1994 | Angeli |
| 5,868,155 A | 2/1999 | Hutton |

FOREIGN PATENT DOCUMENTS

| DE | 195 03 488 A1 | 8/1996 |
| DE | 197 18 454 A1 | 11/1998 |
| EP | 0 126 697 | 11/1984 |
| GB | 2 091 883 | 8/1982 |
| GB | 2 410 332 A | 7/2005 |
| JP | 63-011827 A | 1/1988 |
| JP | 1-285832 | 11/1989 |
| JP | 11-201309 | 7/1999 |
| WO | 2005/019713 A1 | 3/2005 |

*Primary Examiner* — William McCalister
*Assistant Examiner* — Michael R Reid
(74) *Attorney, Agent, or Firm* — Davis & Bujold, PLLC; Michael J. Bujold

(57) ABSTRACT

A valve assembly (1) for measuring differential pressures in a fluid system where the valve assembly includes a differential pressure sensor (12) for registration of differential pressures, a first cavity (22) with a calibrating cone (10) displaceable between measuring and a zero point calibration/flushing position. The valve assembly (1) includes a valve body (7) with two connections (13, 14) and a second cavity (15) arranged with a safety valve cone (8) which protects the differential pressure sensor (12). The safety valve cone (8), by differential pressures higher than a dimensioned value, is moved in a direction towards the low pressure side and, as a result, a passage between high and low pressure side is opened, from one connection (13) to the other connection (14) via the second cavity (15) and via provided cavities (24) and recesses (25) in the safety valve cone (8), whereby a pressure equalizing occurs.

20 Claims, 5 Drawing Sheets

VALVE ASSEMBLY FOR A DIFFERENTIAL PRESSURE SENSOR WITH SAFETY VALVE

This application is a national stage completion of PCT/SE2011/050662 filed May 27, 2011 which claims priority from Swedish Application Serial No. 1100082-5 filed Jun. 28, 2010.

TECHNICAL FIELD

The present invention relates to a valve assembly for a differential pressure sensor for measuring the pressure in a fluid system, for instance in a heating or cooling system and where the assembly is mounted, via measuring hoses, on a measuring nipple to, for example, a valve, or a measuring nipple directly on a container or a piping, and where the assembly protects the differential pressure sensor against prohibited differential pressure levels.

BACKGROUND OF THE INVENTION

To measure pressure in fluid systems, differential pressure sensors are often used in combination with some sort of valve assembly, which has a primary purpose of protecting the differential pressure sensor against extreme continuous pressures or pressure shocks that higher than the sensor can handle. Such assemblies often also have functions for flushing the assembly to get rid of enclosed air in cavities and have functions to calibrate the differential pressure sensor, a so called zero point calibration. The purpose of the calibration procedure is to ensure that before measuring begins, both measuring sides of the pressure sensor have the same pressure.

There are several examples of devices addressing the problem of how to protect a differential pressure sensor against prohibited differential pressure levels. Examples of such solutions are DE 19503488, which describes a device with two safety valves (4, 5) that protects the differential pressure sensor against prohibited differential pressure levels, and also GB 2091883 A, which also describes a device with safety valves (46, 48) for protecting against prohibited differential pressure levels.

Moreover there is a solutions, in GB 2 410 332 A, which includes the functions of zero point calibration and flushing a valve assembly, where two safety valves (36, 38) are utilized to protect the differential pressure sensor (26) against prohibited differential pressure levels. The two safety valves (36, 38) in this device are designed as non return valves, which each protect a connection side at the differential pressure sensor. Depending on which side of the connection is connected to the highest pressure, the respective safety valve protects one side/direction each.

The problem with earlier solutions, for instance the solution described in GB 2 410 332 A above, is that at least two safety valves are required, and with them are arranged ducts, to protect the complete valve assembly against extreme differential pressures, which consequently makes the manufacturing the device more expensive and more difficult.

SUMMARY OF THE INVENTION

The object of the present invention is to solve the problem of protecting the differential pressure sensor with only one component and in that way that simplifies the manufacture of the complete valve assembly and hence allows lower costs of manufacturing.

In the known solutions, valve assemblies are protected against prohibited differential pressure levels by utilizing two safety valves. The reason why two safety valves are used is that when connecting valve assemblies to measuring nipples of a fluid system, one cannot know in advance which one of the measuring sides that will receive the highest pressure. The two safety valves therefore protect the differential pressure sensor against extreme pressures independent of which direction the high pressure comes from. In the present invention this is solved by one component, a cone, termed a safety valve cone, which offers advantages in, among other things, the areas of function, manufacturing, and costs. The safety valve cone is arranged displaceable in a cavity, so that when it is subjected to a differential pressure higher than a dimensioned value, the safety valve cone is displaced in the cavity in the direction from the high pressure side towards the low pressure side, and a passage is opened between the connections on the high side and the low pressure side, so that a pressure equalization occurs. The complete valve assembly, in addition to the present invention, also includes other advantages, which are disclosed by this, including a calibration cone, has two positions in the complete valve assembly. Those positions are a measuring position and a combined zero point calibration/flushing position. In the latter combined position, the differential pressure sensor is separated from the fluid flow. At the zero point calibration, the two measuring sides of the differential pressure sensor are fluidly separated from the flowing fluid, through seals on the calibration cone separating the measuring sides of the differential pressure sensor from the fluid. This combined position constitutes the initial position of the valve assembly. The advantage with the present invention, compared to the known solutions, is that the differential pressure sensor is protected against extreme differential pressures with only one safety valve cone, instead of several valve or protection devices.

In a preferred embodiment of the invention the safety valve cone is in its initial position, arranged between both the orifices of the connections towards or to the cavity, where the safety valve cone is arranged. Accordingly, the advantage is obtained that, when connecting a valve assembly to measuring nipples of a construction, it doesn't matter which one of the connections is the high pressure or the low pressure side, respectively, since the safety valve cone can "be triggered", i.e. be moved to either side, and the side moved to will be the low pressure side. The valve assembly will therefore be freely reversible with respect to the connections.

According to a further preferred embodiment of the invention, the safety valve cone is arranged before both the cavity, which includes the calibration cone, and also before the differential pressure sensor, seen in the flowing direction. That is, the safety valve cone is arranged closest to the connections of the fluid system compared to the cavity and the differential pressure sensor. Accordingly, the protection is always active, independent of the position of the calibration cone, the measuring position, or the combined position for zero point calibration/flushing.

According to a further preferred embodiment of the invention, the safety valve cone is arranged to always return to its initial position, between the orifices of the two connections towards the cavity in which the safety valve cone is arranged, in those cases when the differential pressure between the connections is lower than the dimensioned value. This is possible because the cavity includes return springs on both sides of the safety valve. The return springs are dimensioned to be compressed by the safety valve cone, when the safety valve cone is moved towards whichever return spring is at the low pressure side, when the device is at differential pressures higher than the value that the springs are dimensioned for. When the differential pressure is again lower than the dimensioned value, the clamped spring expands, whereby the safety valve cone returns to its neutral initial position, and as a result the safety function is by that back in the "readiness position".

According to another preferred embodiment of the invention the safety valve cone is protected against extreme differential pressures by further protective functions in the initial position of the valve assembly. This through the protection of the safety valve cone in the initial position. That is, according to the invention, in the zero point calibration/flushing position the calibration cone protects the differential pressure sensor against fluid contact. Thus, compared to known solutions, the advantage is obtained that the risk of exposing the differential pressure sensor to extreme pressures is minimal when the valve assembly is connected to a fluid system.

According to a further preferred embodiment of the invention the design of the safety valve cone is symmetrical regarding both of its possible moving directions, and further its form is preferable cylindrical. The symmetric form makes it impossible to mount the safety valve incorrectly when mounting the complete valve assembly. In addition the cavity, in which the safety cone is mounted, is sized to fit the exterior dimensions of the safety valve cone. This allows that the function is secured while the component, by mounting, always lands in a way that the intended function is obtained, independently of which end of the safety valve cone lands in respective direction/moving direction.

To sum up some advantages that are obtained with the present invention in comparison to existing fluid pressure measuring devices:

the valve assembly protects the differential pressure sensor against extreme differential pressures with only one component, a safety valve cone, instead of several valve or protection devices;

the valve assembly protects the differential pressure sensor against extreme differential pressures, where this protection function operates independently to whichever connection side connects to the high pressure side;

the protection is always active and is independent of the position of the calibration cone, be it the measuring position or the combined zero point calibration/flushing position;

the safety valve cone always returns to its initial position, after which it is "triggered", whereupon it again is in the protection position;

the valve assembly includes multiple protections of the flushing and zero point calibration, i.e. in the initial position, whereby the risk that the differential pressure sensor is exposed to extreme pressure is minimal when the valve assembly is connected to a fluid system; and the safety valve cone is symmetrical and as a result cannot be turned in a wrong direction when it is mounted in the intended cavity in the valve body.

The above mentioned preferred embodiments of the invention are stated in the dependent claims. The constructive design of the present invention is described in detail in the following description of an example embodiment of the invention, with reference to the accompanying drawings showing a preferred, but not limiting, embodiment of the invention. Moreover the invention provides advances over the prior art in different respects. This is realized in the present invention by an arrangement characterized by the base claim.

BRIEF DESCRIPTION OF THE DRAWINGS

The invention is represented in detail in diametrical, partly schematic cross-sections or perspective views.

DETAILED DESCRIPTION OF THE DRAWINGS

Figure 1:
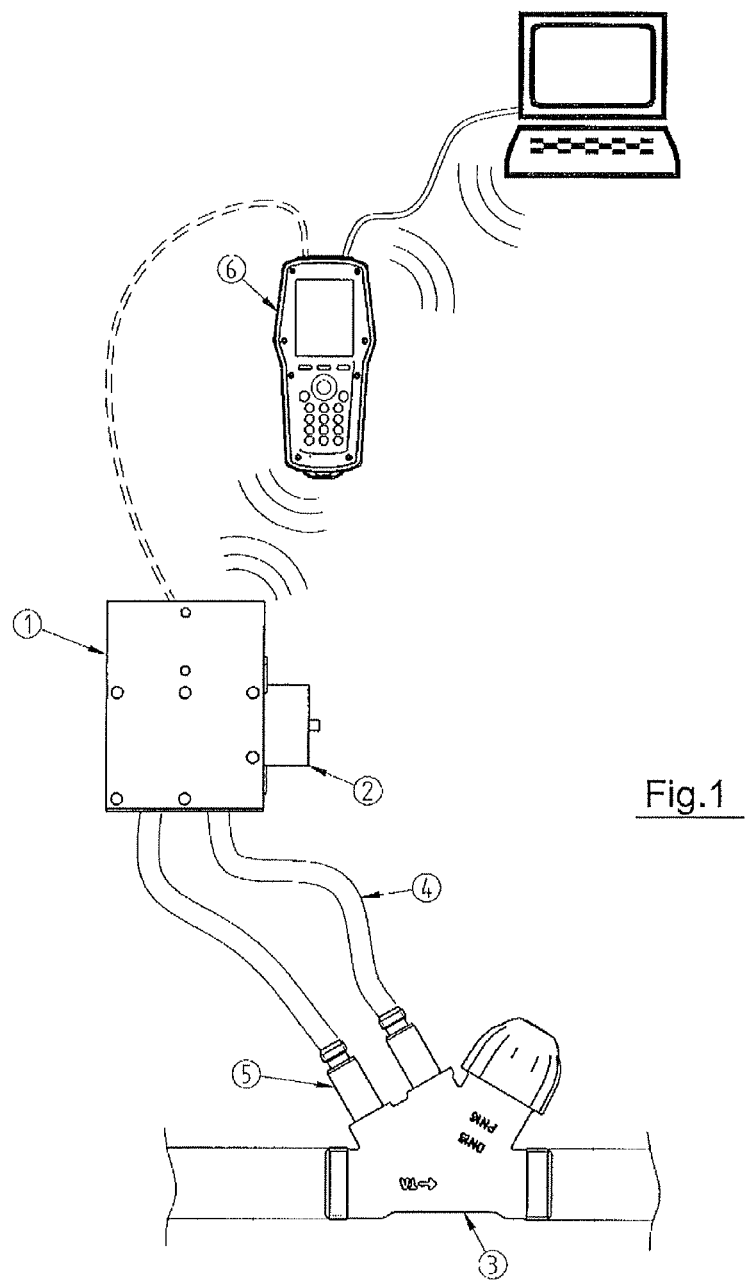
FIG. 1 shows a part of a fluid system where a differential pressure measuring system is connected.

FIG. 1 shows an example of a complete valve assembly 1 provided with an actuator 2 where the valve assembly 1 is connected to a valve 3 via measuring hoses 4, which are connected to the respective measuring nipples 5 of the valve. The figure also includes a manual unit 6 for preferable wireless communication with the actuator 2 and, where appropriate, communication with a computer or a computer system.

Figure 2:
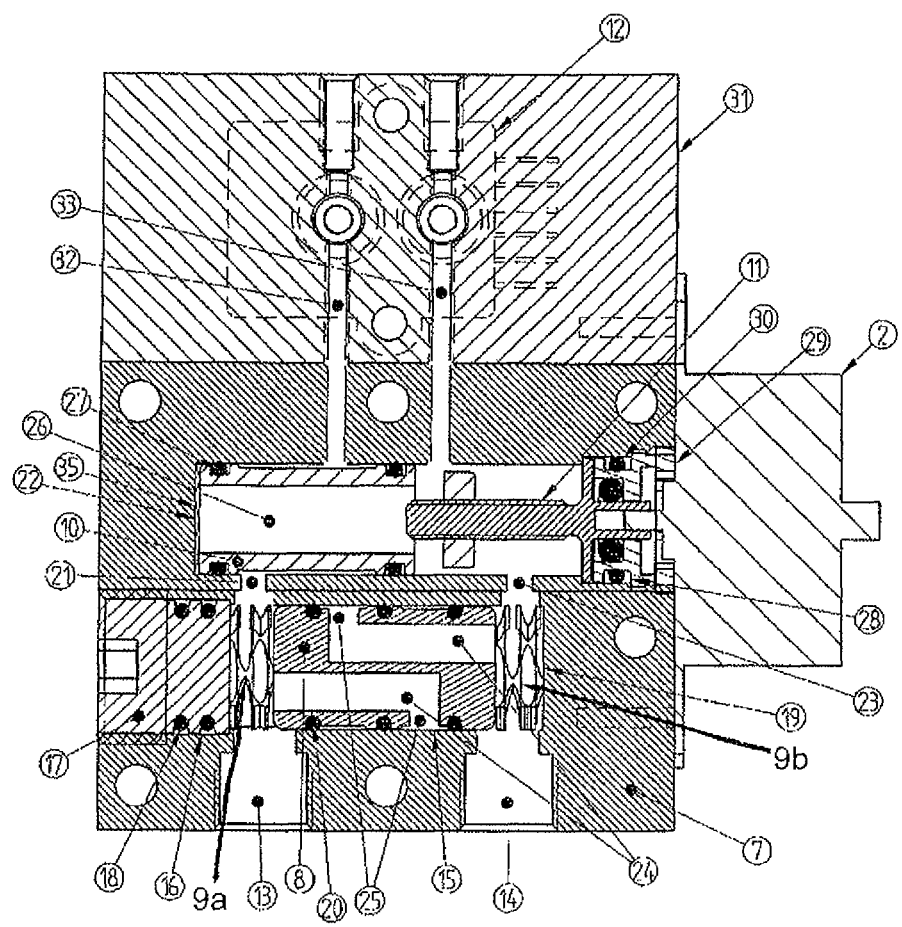
FIG. 2 shows details of the complete valve assembly.

FIG. 2 shows details of the complete valve assembly.

The complete valve assembly is provided with a valve body 7, a safety valve cone (spool) 8, return springs 9a, 9b, located on both sides of the safety valve cone 8, a calibration cone (spool) 10, with an axis 11, connected to the actuator 2. A sensor carrier 31, with a differential pressure sensor 12, is mounted on the valve body 7. The measuring hoses 4 are connected to the valve body 7 via two connections, an inlet 13 and outlet 14. The inlet 13 is intended to be the high pressure side and the outlet 14 is intended to be the low pressure side. Depending on how the connections are made relative to the high/low pressure side of the fluid system, either side of the device can be the inlet or the outlet. In addition the valve body has a cavity 15 that is sized to fit the outer dimensions of the safety valve cone 8. In the outer end 16 of the cavity 15 there is a safety valve stop 17 which provided with sealing elements 18. There is the first return spring 9a connected with the safety valve stop 17. The safety valve stop 17 constitutes the base for the return spring 9a. A second return spring 9b is placed at the bottom 19 of the cavity. The safety valve cone 8 is situated between the first return spring 9a and a second return spring 9b and, as a result, is clamped between the two return springs. The safety valve cone 8 preferably includes two interior recessed cavities 24 arranged in a common axial direction relative the safety valve cone. The cavities have an orifice in each end of the safety valve cone 8, where each cavity has a communication. Additionally, each cavity has a recess 25 that extends outwards to the periphery of the cone. The safety valve cone 8 is externally provided with sealing elements 20, on the surface of the periphery, on either side of the recesses 25. At the first return spring 9a, a duct 21 extends from the inlet 13, via the cavity 15, and further up to a cavity 22 that by sized to fit the outer dimensions of the calibration cone 10. Similarly, a second duct 23 extends from the outlet 14 to the cavity 22, via the bottom 19 of the cavity 15. The calibration cone 10 is situated in the cavity 22. The calibration cone 10 preferably includes an interior recessed cavity 26 that is axially aligned relative the calibration cone and that extends through the entire length of the calibration cone 10. The exterior of the calibration cone 10 is preferably provided with two sealing elements 27 along the peripheral surface, at each respective end. At the other end 28 of the cavity 22 there is a stop lug 29, provided with sealing elements 30. This stop lug 29 constitutes the attachment/holder of the actuator 2. Its axis 11 projects through the stop lug 29. The axis 11 is fastened at the calibration cone 10. A return spring 35 is clamped between the bottom of the cavity 22 and the calibration cone 10. Ducts 32 and 33 extend from the peripheral surface of the cavity 22 to the differential pressure sensor 12 in the sensor support 31.

Figure 3:
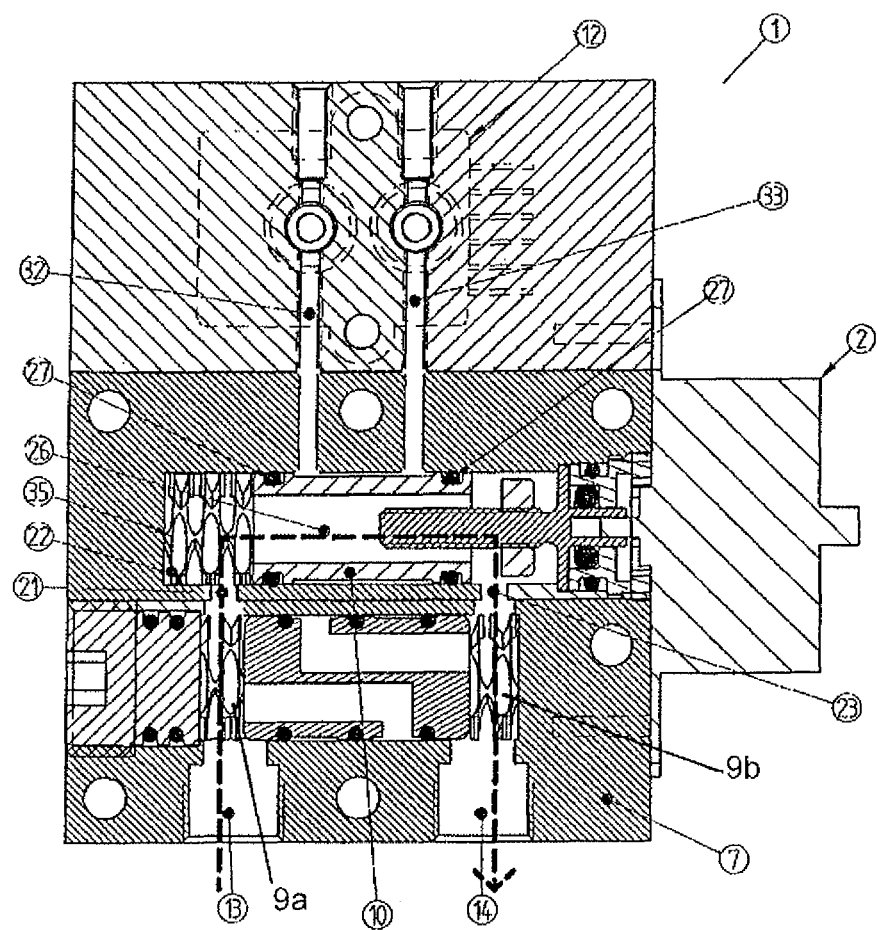
FIG. 3 shows the complete valve assembly in the initial position, that is, in the flushing/zero point calibration position.

FIG. 3 shows the complete valve assembly in its initial position, i.e., the flushing/zero point calibration position.

Except for when measuring, the valve assembly is always in its initial position, that is, in its position for flushing/zero point calibration. After completing a measuring sequence, either the actuator 2 or another stored energy element, like a return spring 35, causes the device to return to the flushing/zero point calibration position. In this initial position, the calibration cone 10 is located between the ducts 21 and 23 and thereby both the sealing elements 27 are positioned on either side of the ducts 32 and 33. This causes ducts 32 and 33 to be short circuited, and consequently receive the same static pressure. Accordingly, the differential pressure sensor 12 will be zero point calibrated, and the calibration will occur outside the fluid flow because the ducts 32 and 33 contact a location of the cavity's 22 peripheral surface, which is sealed by the sealing elements 27, located on the calibration cone 10, from the remainder of the cavity 22. The flushing occurs at the same time because the design of the calibration cone and its position permit an open flowing passage between high and low pressure side, that is, from the first connection/inlet 13, via the duct 21, to the cavity 22, through the cavity 26 of the calibration cone 10 and back to the cavity 22, then to the duct 23, and thereafter to the second connection/outlet 14. After this process, the complete valve assembly 1 is flushed and free from enclosed air, and the valve assembly is zero point calibrated.

Figure 4A:
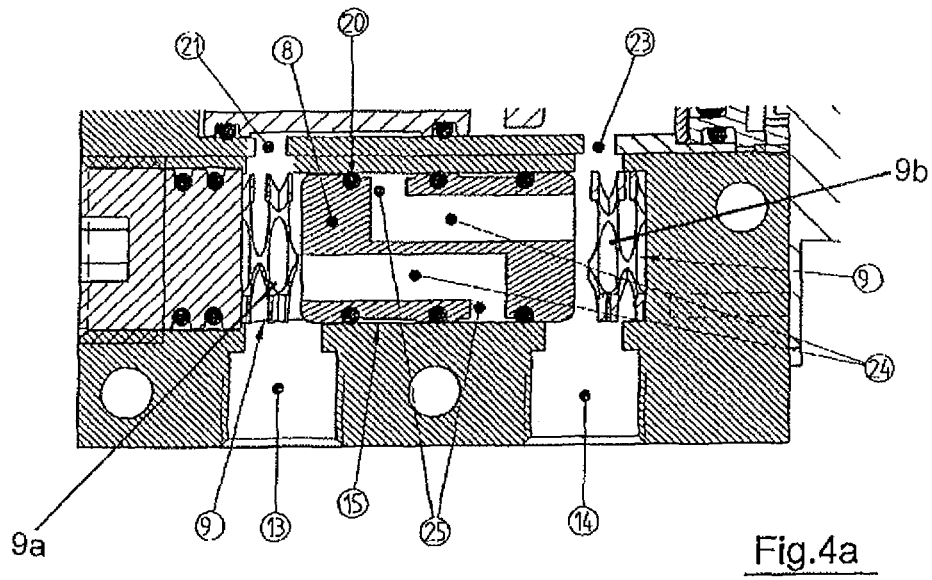
FIG. 4a shows a detailed view of the safety valve in the normal position.

FIG. 4a shows the safety valve in normal position.

When the complete valve assembly 1 is exposed to differential pressures lower than those which cause the protection function, including the return springs 9a, 9b and the safety valve cone 8, to engage, the safety valve cone will be in a position between both the return springs 9a, 9b and the ducts 21, 23. In this position, the passage through the cavity 24 of the safety valve cone 8 and the recess 25 is closed. As a result, communication between the inlet and outlet connections 13, 14 is not possible. Fluid passage between the high and low pressure side is made impossible, in this position, because the sealing that occurs by means of the sealing elements 20 on either sides of the orifice of the recesses 25 to the wall of the cavity 15. This constitutes the normal position of the safety valve, in the valve assembly 1, when the protection function is in a "readiness position", that is, not in the trigged position.

Figure 4B:
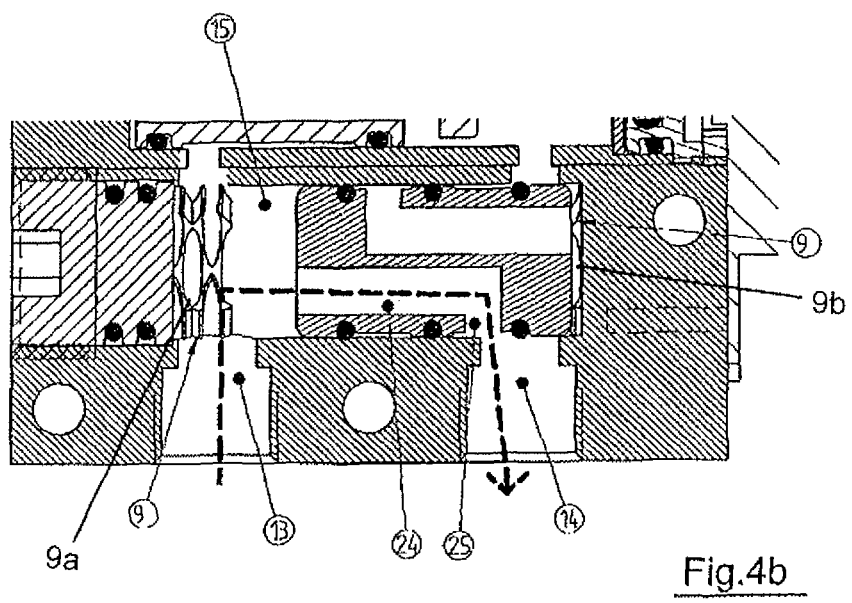
FIGS. 4b and 4c show detailed views of the safety valve in alternative trigged positions.
Figure 4C:
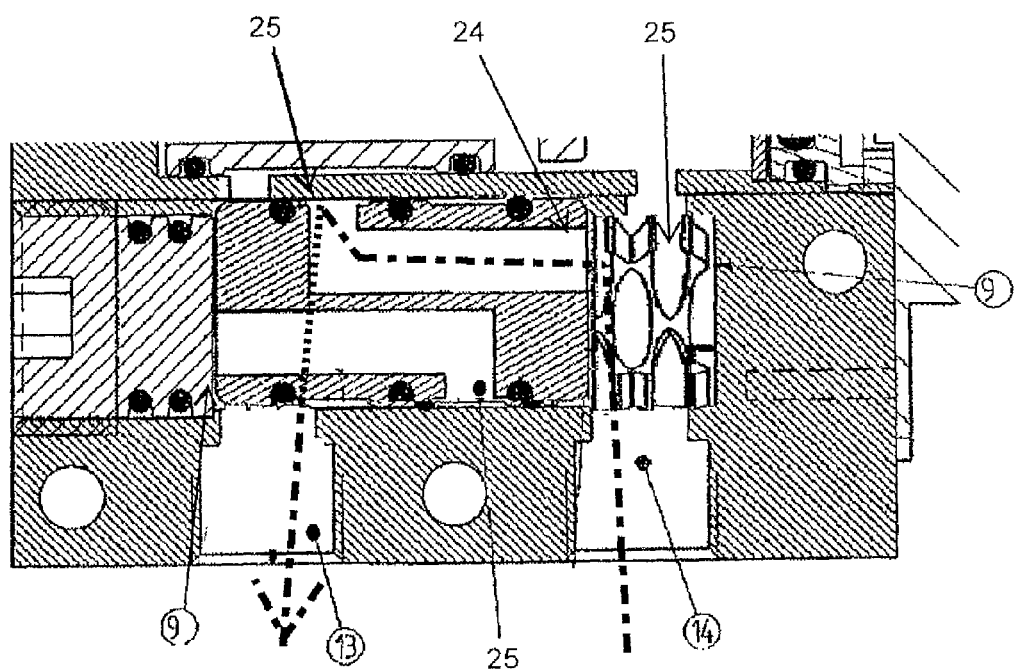

FIGS. 4b and 4c show the safety valve in alternative trigged positions.

When the differential pressure exceeds a value for which the safety valve cone 8 and the return springs 9a, 9b are dimensioned, as shown in FIG. 4b, the safety valve cone 8 is pressed in a direction towards the side with the lowest pressure, and the return spring 9b, on this lower pressure side, is compressed. This causes the passage between high and low pressure side to open, allowing fluid to be passed from the inlet 13, to the cavity 15, through the cavity 24 and the recess 25 of the safety valve cone 8, and further outwards to the outlet 14. On the other hand, as shown in FIG. 4c, the fluid can flow in opposite direction if the high and low pressure sides are the reversed. Accordingly, in one component/function, a two directional protection is provided to prevent extreme pressure passing to the connected differential pressure sensor 12.

COMPONENT LIST 1 valve assembly
2 actuator
3 valve
4 measuring hose
5 measuring nipple
6 manual unit
7 valve body
8 safety valve cone
9 return spring
10 calibration cone
11 axis
12 differential pressure sensor
13 inlet
14 outlet
15 cavity
16 outer end
17 safety valve stop
18 sealing element
19 bottom
20 sealing element
21 duct
22 cavity
23 duct
24 cavity
25 recess
26 cavity
27 sealing element
28 outer end
29 stop lug
30 sealing element
31 sensor carrier
32 duct
33 duct

The invention claimed is:

1. A device comprising part of a system for measuring differential pressures in a fluid system, the device comprising:
a valve assembly (1) including a valve body (7) with first and second connections (13, 14) for connection to the fluid system,
ducts (32, 33) for communication with a differential pressure sensor (12) for registration of the differential pressure,
a first cavity (22) in communication with the ducts (32, 33), where the first cavity (22) includes a calibration spool (10) which is displaceable in the first cavity (22) between a measure position and a position for zero point calibration/flushing of the valve assembly (1), the calibration spool (10) separating the differential pressure sensor (12) from the fluid system when the calibration spool (10) is in its initial position, and the calibration spool (10) including sealing elements (27), which prevent fluid communication between the ducts (32, 33) and the first cavity (22),
wherein the valve assembly (1) includes a second cavity (15) with a safety valve spool (8), the safety valve spool (8) protects the differential pressure sensor (12) against an excessive differential pressure since the safety valve spool (8) is arranged to be displaced, by differential pressures higher than a dimensioned value, in a direction towards a low pressure side and, as a result, opens a passage between a high pressure side and the low pressure side, formed between the first connection (13) and the second connection (14), via the second cavity (15) in the valve body (7) and via cavities (24) and recesses (25) provided in the safety valve spool (8) so that a pressure equalizing occurs.

2. The device according to claim 1, wherein the safety valve spool (8) always is displaceable toward the low pressure side independent of which of the first and the second connections (13, 14) constitutes the high pressure side and the low pressure side since the safety valve spool (8), in its initial position, is arranged between the orifices of the first and second connections (13, 14) which communicate with the second cavity (15).

3. The device according to claim 1, wherein the safety valve spool (8), in the flowing direction, is arranged before the first cavity (22) including the calibration spool (10), and before the differential pressure sensor (12), whereby the differential pressure sensor (12) always is protected against excessive differential pressures, independent of whether the calibration spool (10) is in its measuring position or in the initial position for zero point calibration/flushing of the valve assembly (1).

4. The device according to claim 1, wherein the safety valve spool (8) is arranged to return to its initial position, between the orifices of the first and second connections (13, 14) within the second cavity (15), when the differential pressure is lower than a dimensioned value, and the second cavity (15) includes return springs (9a, 9b) that are respectively arranged on opposite sides of the safety spool (8).

5. The device according to claim 1, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

6. The device according to claim 1, wherein the safety valve spool (8) is symmetrical, with respect to two possible moving directions.

7. The device according to claim 2, wherein the safety valve spool (8), in the flowing direction, is arranged before the first cavity (22) including the calibration spool (10), and before the differential pressure sensor (12), whereby the differential pressure sensor (12) always is protected against excessive differential pressures, independent of if the calibration spool (10) is in its measuring position or in the position for zero point calibration/flushing through the valve assembly (1), i.e. in its initial position.

8. The device according to claim 2, wherein the safety valve spool (8) is arranged to return to its initial position, between the orifices of the first and second connections (13, 14) which communicate with the second cavity (15), when the differential pressure is lower than a dimensioned value, and the second cavity (15) includes return springs (9a, 9b) that are respectively arranged on opposite sides of the safety spool (8).

9. The device according to claim 3, wherein the safety valve spool (8) is arranged to return to its initial position, between the orifices of the first and second connections (13, 14) which communicate with the second cavity (15), when the differential pressure is lower than a dimensioned value, and the second cavity (15) includes return springs (9a, 9b) that are respectively arranged on opposite sides of the safety spool (8).

10. The device according to claim 7, wherein the safety valve spool (8) is arranged to return to its initial position, between the orifices of the first and second connections (13, 14) which communicate with the second cavity (15), when the differential pressure is lower than a dimensioned value, and the second cavity (15) includes return springs (9a, 9b) that are respectively arranged on opposite sides of the safety spool (8).

11. The device according to claim 2, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

12. The device according to claim 3, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

13. The device according to claim 4, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

14. The device according to claim 8, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

15. The device according to claim 9, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

16. The device according to claim 10, wherein in the initial position of the valve assembly (1), the calibration spool (10) separates the differential pressure sensor (12) from the fluid system and, at the same time, the safety valve spool (8), in the initial position, protects the differential pressure sensor (12) so as to provide dual protection for the differential pressure sensor (12) against the excessive differential pressure.

17. The device according to claim 2, wherein the safety valve spool (8) is symmetrical, with respect to each of two possible moving directions.

18. The device according to claim 3, wherein the safety valve spool (8) is symmetrical, with respect to each of two possible moving directions.

19. The device according to claim 4, wherein the safety valve spool (8) is symmetrical, with respect to each of two possible moving directions.

20. The device according to claim 5, wherein the safety valve spool (8) is symmetrical, with respect to each of two possible moving directions.

* * * * *